United States Patent
Suzuki

(10) Patent No.: US 11,418,989 B2
(45) Date of Patent: Aug. 16, 2022

(54) SYSTEM, INFORMATION PROCESSING DEVICE, AND METHOD

(71) Applicant: TOSHIBA TEC KABUSHIKI KAISHA, Tokyo (JP)

(72) Inventor: Shigeaki Suzuki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 17/085,063

(22) Filed: Oct. 30, 2020

(65) Prior Publication Data

US 2021/0266770 A1 Aug. 26, 2021

(30) Foreign Application Priority Data

Feb. 25, 2020 (JP) .............................. JP2020-029312

(51) Int. Cl.
*H04W 24/10* (2009.01)
*G08B 21/18* (2006.01)
*H04B 5/00* (2006.01)

(52) U.S. Cl.
CPC .......... *H04W 24/10* (2013.01); *G08B 21/182* (2013.01); *H04B 5/0062* (2013.01)

(58) Field of Classification Search
CPC ........ H04W 24/02; H04W 24/10; H04B 5/00; H04B 5/0062; G08B 21/18
See application file for complete search history.

(56) References Cited

U.S. PATENT DOCUMENTS

| | | | |
|---|---|---|---|
| 7,764,164 B2 | 7/2010 | Tanaka | |
| 10,109,061 B2* | 10/2018 | Bose | A63F 13/812 |
| 10,559,138 B2* | 2/2020 | Worden | G08C 17/02 |
| 10,630,828 B2* | 4/2020 | Park | H04W 12/06 |
| 2004/0117301 A1 | 6/2004 | Fujisawa et al. | |
| 2006/0279409 A1 | 12/2006 | Yang et al. | |
| 2010/0001863 A1 | 1/2010 | Salim et al. | |

(Continued)

FOREIGN PATENT DOCUMENTS

| | | |
|---|---|---|
| JP | 2010-067035 A | 3/2010 |
| WO | WO-2007/026412 A1 | 3/2007 |

OTHER PUBLICATIONS

Extended European Search Report dated May 31, 2021 issued in corresponding European Patent Application No. 20212758.5, 8 pages.

*Primary Examiner* — Thanh C Le
(74) *Attorney, Agent, or Firm* — Foley & Lardner LLP

(57) ABSTRACT

A system includes a plurality of readers and an information processor. The reader includes a first communicator, an antenna, and a first processor. An antenna communicates with radio tags. The first processor measures a time in which radio waves are received with a plurality of channels in a carrier sense time, the carrier sense time being a time in which the radio tags are not communicating and transmits a channel report indicating a time in which radio waves are received with each channel to the information processor through the first communicator. The information processor includes a second communicator and a second processor. The second processor acquires the channel report through the second communicator and generates an aggregate report indicating channel states while the plurality of readers are not communicating with the radio tags based on the plurality of acquired channel reports.

17 Claims, 9 Drawing Sheets

(56) References Cited

U.S. PATENT DOCUMENTS

| | | |
|---|---|---|
| 2011/0273294 A1 | 11/2011 | Harwell |
| 2020/0143267 A1* | 5/2020 | Gidney ................. H04L 9/3239 |
| 2020/0252233 A1* | 8/2020 | O'Keeffe ............ H04L 12/2818 |
| 2021/0264765 A1* | 8/2021 | Suzuki ............... G06K 7/10029 |
| 2022/0155290 A1* | 5/2022 | Khattak ................... G01N 1/38 |

* cited by examiner

FIG. 6

| CHANNEL NUMBER | CHANNEL-USABLE FLAG | TIME1 (×10ms) | TIME2 (×10ms) | CS LEVEL dBm |
|---|---|---|---|---|
| 0 | 0 | 0 | 1000 | -3 |
| 1 | 0 | 0 | 0 | -99 |
| 2 | 0 | 0 | 0 | -99 |
| 3 | 0 | 0 | 0 | -99 |
| 4 | 0 | 0 | 0 | -99 |
| 5 | 0 | 0 | 0 | -99 |
| 6 | 1 | 500 | 0 | -99 |
| 7 | 1 | 0 | 0 | -99 |
| 8 | 1 | 0 | 0 | -99 |
| 9 | 1 | 0 | 1000 | -50 |
| 10 | 1 | 0 | 0 | -99 |
| 11 | 1 | 0 | 2000 | -45 |
| 12 | 1 | 0 | 0 | -99 |
| 13 | 0 | 0 | 0 | -99 |
| 14 | 0 | 0 | 0 | -99 |
| 15 | 0 | 0 | 0 | -99 |
| 16 | 0 | 0 | 0 | -99 |
| 17 | 0 | 0 | 0 | -99 |
| 18 | 0 | 0 | 0 | -99 |

| OPERATIONAL TIME | 100000 | ×10ms |

FIG. 9

| CHANNEL NUMBER | AGGREGATE TIME1 (× 10ms) | AGGREGATE TIME2 (× 10ms) | AGGREGATE CS LEVEL dBm |
|---|---|---|---|
| 0 | 0 | 1,000 | -99 |
| 1 | 0 | 0 | -99 |
| 2 | 0 | 0 | -99 |
| 3 | 0 | 0 | -99 |
| 4 | 0 | 0 | -99 |
| 5 | 0 | 0 | -99 |
| 6 | 40,000 | 30,000 | -99 |
| 7 | 0 | 90,000 | -60 |
| 8 | 0 | 0 | -99 |
| 9 | 0 | 10,000 | -50 |
| 10 | 0 | 0 | -99 |
| 11 | 0 | 20,000 | -45 |
| 12 | 0 | 0 | -99 |
| 13 | 0 | 0 | -99 |
| 14 | 0 | 0 | -99 |
| 15 | 0 | 0 | -99 |
| 16 | 0 | 0 | -99 |
| 17 | 0 | 0 | -99 |
| 18 | 0 | 0 | -99 |

| AGGREGATE OPERATIONAL TIME | 100,000 | × 10ms | ns
SYSTEM, INFORMATION PROCESSING DEVICE, AND METHOD

CROSS-REFERENCE TO RELATED APPLICATION

This application is based upon and claims the benefit of priority from Japanese Patent Application No. 2020-029312, filed in Feb. 25, 2020, the entire contents of which are incorporated herein by reference.

FIELD

Embodiments described herein relate generally to a system, an information processing device, and a method.

BACKGROUND

Readers acquiring data such as IDs from radio tags such as radio frequency identification (RFID) tags have been provided. Such readers search for channels unused for other devices, among channels allocated to the readers by a system, to prevent crosstalk with other devices. The readers communicate with radio tags with the searched channels.

In the related art, there is a problem that a channel state cannot be ascertained while each reader is not communicating with a radio tag.

DESCRIPTION OF THE DRAWINGS

FIG. 6 is a diagram illustrating a structural example of a channel report according to at least one embodiment;

FIG. 9 is a diagram illustrating a configuration example of a aggregate report according to at least one embodiment.

DETAILED DESCRIPTION

In general, an exemplary embodiment provides a system, an information processing device (information processor), and a method capable of ascertaining a channel state while a reader does not communicate with a radio tag.

According to at least one embodiment, a system includes a plurality of readers, and an information processing device (information processor). The reader includes a first communication unit (communicator), an antenna, and a first processor. An antenna communicates with radio tags. A first processor measures a time in which radio waves are received with a plurality of channels in a carrier sense time, the carrier sense time being a time in which the radio tags are not communicating and transmits a channel report indicating a time in which radio waves are received with each channel to the information processing device through the first communication unit. The information processing device includes a second communication unit and a second processor. The second processor acquires the channel report through the second communication unit (communicator) and generates an aggregate report indicating channel states while the plurality of readers are not communicating with the radio tags based on the plurality of acquired channel reports.

Hereinafter, at least one embodiment will be described with reference to the drawings.

A POS system according to at least one embodiment settles a commodity to which a radio tag such as an RFID is attached. The POS system acquires an ID from the radio tag attached to the commodity using a reader that communicates with the radio tag. The POS system specifies a price and a kind of commodity based on the acquired ID. The POS system settles a commodity based on the price or the like of the commodity. For example, the POS system settles commodities exhibited in a store or the like.

Figure 1:
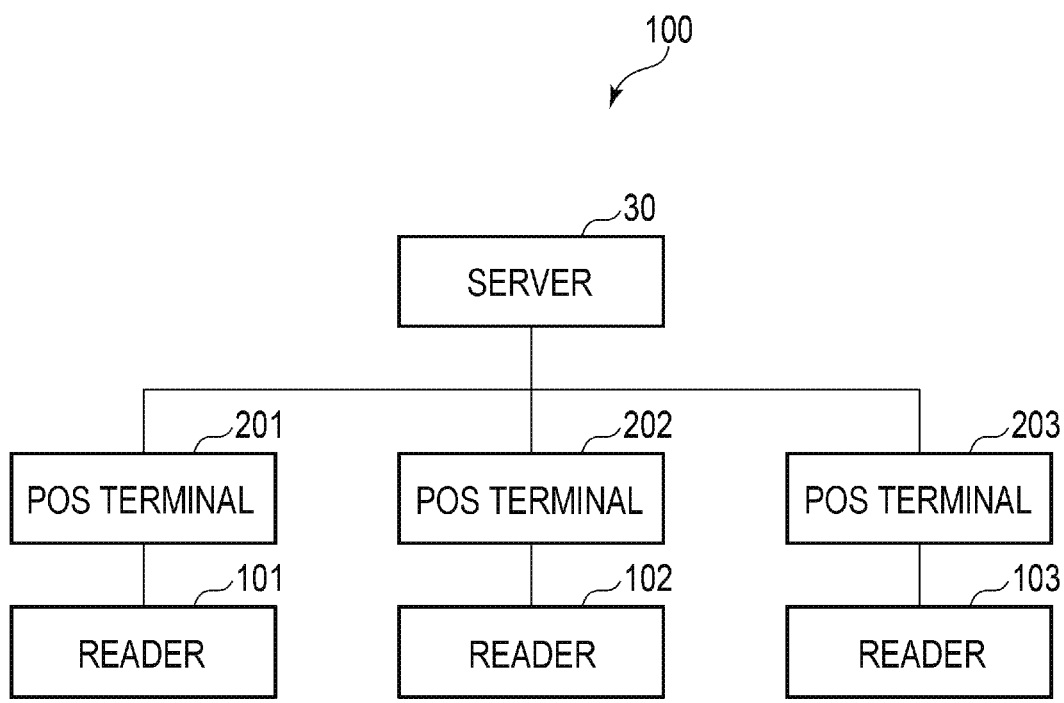
FIG. 1 is a block diagram illustrating a configuration example of a POS system according to at least one embodiment.

FIG. 1 is a block diagram illustrating a configuration (structural) example of a POS system 100 according to at least one embodiment. As illustrated in FIG. 1, the POS system 100 includes readers 101 to 103, POS terminals 201 to 203, and a server 30. The server 30 is connected to the POS terminals 201 to 203 in a wireless or wired manner. The POS terminals 201 to 203 are connected to the readers 101 to 103 to be communicable in a wireless or wired manner.

The POS system 100 may have a configuration, as necessary, in addition to the configuration illustrated in FIG. 1 or a specific configuration may be excluded from the POS system 100.

The readers 101 to 103 read IDs from radio tags attached to commodities. The readers 101 to 103 transmit the read IDs to the POS terminals 201 to 203, respectively. The readers 101 to 103 are handy type terminals that read radio tags when operators hold the readers 101 to 103. The readers 101 to 103 will be described in detail later.

The IDs read by the readers 101 to 103 may be IDs for specifying commodities. For example, an ID includes a stock keeping unit (SKU) code indicating a kind of commodity to which a radio tag is attached and a serial number for specifying an individual commodity. For example, the SKU code is a Japanese article number (JAN) code. The configuration of the ID is not limited to a specific configuration.

The POS terminals 201 to 203 settle commodities based on IDs or the like from the readers 101 to 103, respectively. For example, the POS terminals 201 to 203 specify prices of the commodities based on the IDs from the readers 101 to 103, respectively. The POS terminals 201 to 203 settle the commodities based on the specified prices. That is, the POS terminals 201 to 203 receive charges of the commodities.

The POS terminals 201 to 203 transmit data from the readers 101 to 103 to the server 30, respectively. The POS terminals 201 to 203 may transmit data from the server 30 to the readers 101 to 103, respectively.

The server 30 (an information processing device) manages the entire POS system 100. The server 30 manages channel states based on the data from the readers 101 to 103. The server 30 will be described in detail later.

The server 30 may be connected to the POS terminals 201 to 203 via a communication network such as the Internet.

Here, the POS system 100 includes three readers 101 to 103. The POS system 100 may include two readers or four or more readers.

The POS terminals 201 to 203 may be connected to a plurality of readers.

Next, the readers 101 to 103 will be described.

The readers 101 to 103 have a similar configuration. Therefore, the reader 101 will be described.

Figure 2:
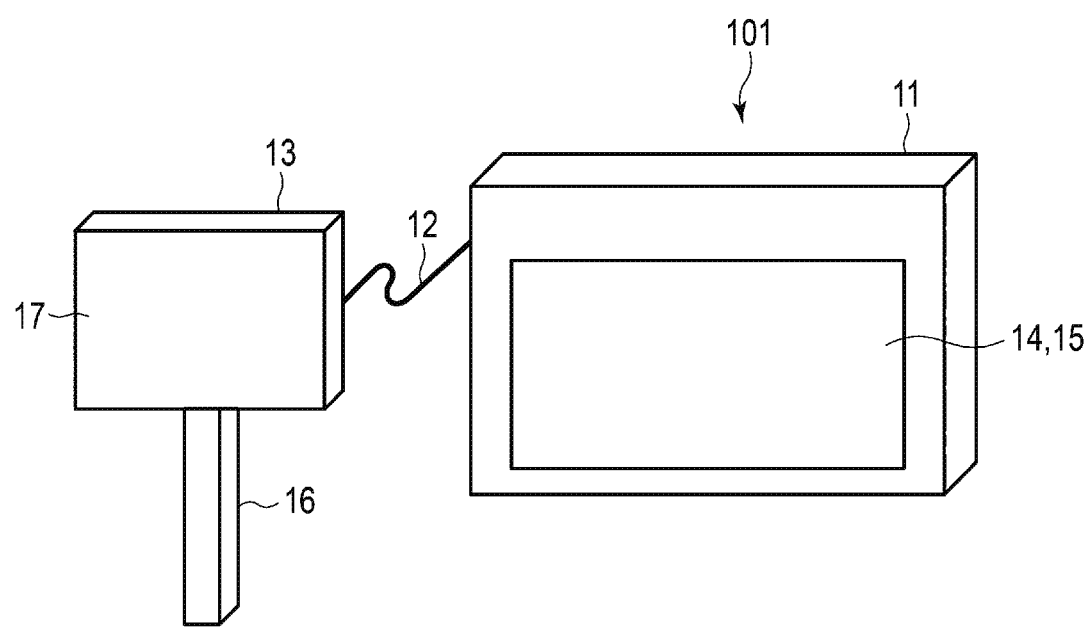
FIG. 2 is a diagram conceptually illustrating a structural example of a reader according to at least one embodiment.

FIG. 2 is a perspective view illustrating the reader 101 according to the embodiment. The reader 101 includes a body 11 and an antenna 13 connected to the body 11 by an antenna cable 12. The body 11 includes an operation unit 14 and a display unit 15.

The operation unit 14 receives an input of various operations from an operator. The operation unit 14 transmits a signal indicating an input operation to a processor 111. Here, the operation unit 14 is configured as a touch panel.

The display unit 15 displays information such as a transaction to be performed, a communication device state, or a communication result. For example, the display unit 15 is configured as a liquid crystal monitor. Here, the display unit 15 is configured as a liquid crystal monitor integrated with the operation unit 14.

The antenna 13 outputs a radio wave with a predetermined channel for communicating with a radio tag. The antenna 13 can output radio waves with a plurality of channels.

The antenna 13 includes a grip 16 and a casing 17. The grip 16 is a handgrip used for an operator to gain the antenna 13.

The antenna 13 and the body 11 may be integrated.

Figure 3:
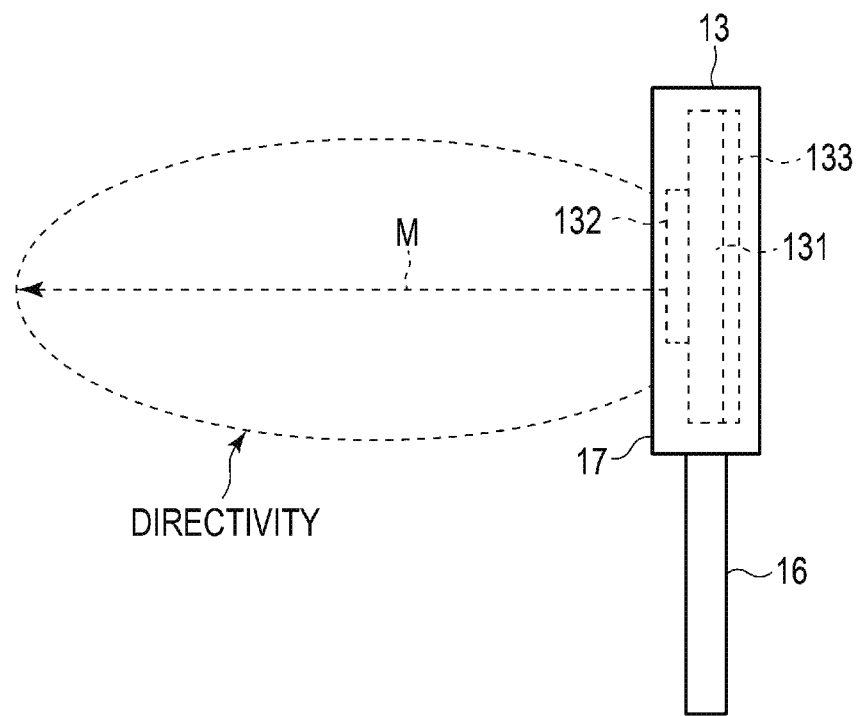
FIG. 3 is a diagram conceptually illustrating a structural example of an antenna according to at least one embodiment.

FIG. 3 is a sectional view illustrating a configuration example of the antenna 13. The antenna 13 is a planar patch antenna. The antenna 13 includes a planar dielectric substance 131, a radiator 132 formed on one surface of the dielectric substance 131, and a ground plane 133 (GND) formed on the other surface of the dielectric substance 131.

The antenna 13 has directivity that has a maximum gain M in a substantially perpendicular direction to the center of one surface. The reader 101 designates one of a plurality of radio tags located within a communication range to perform communication. For example, the radio tag is a radio frequency identification (RFID) tag.

Figure 4:
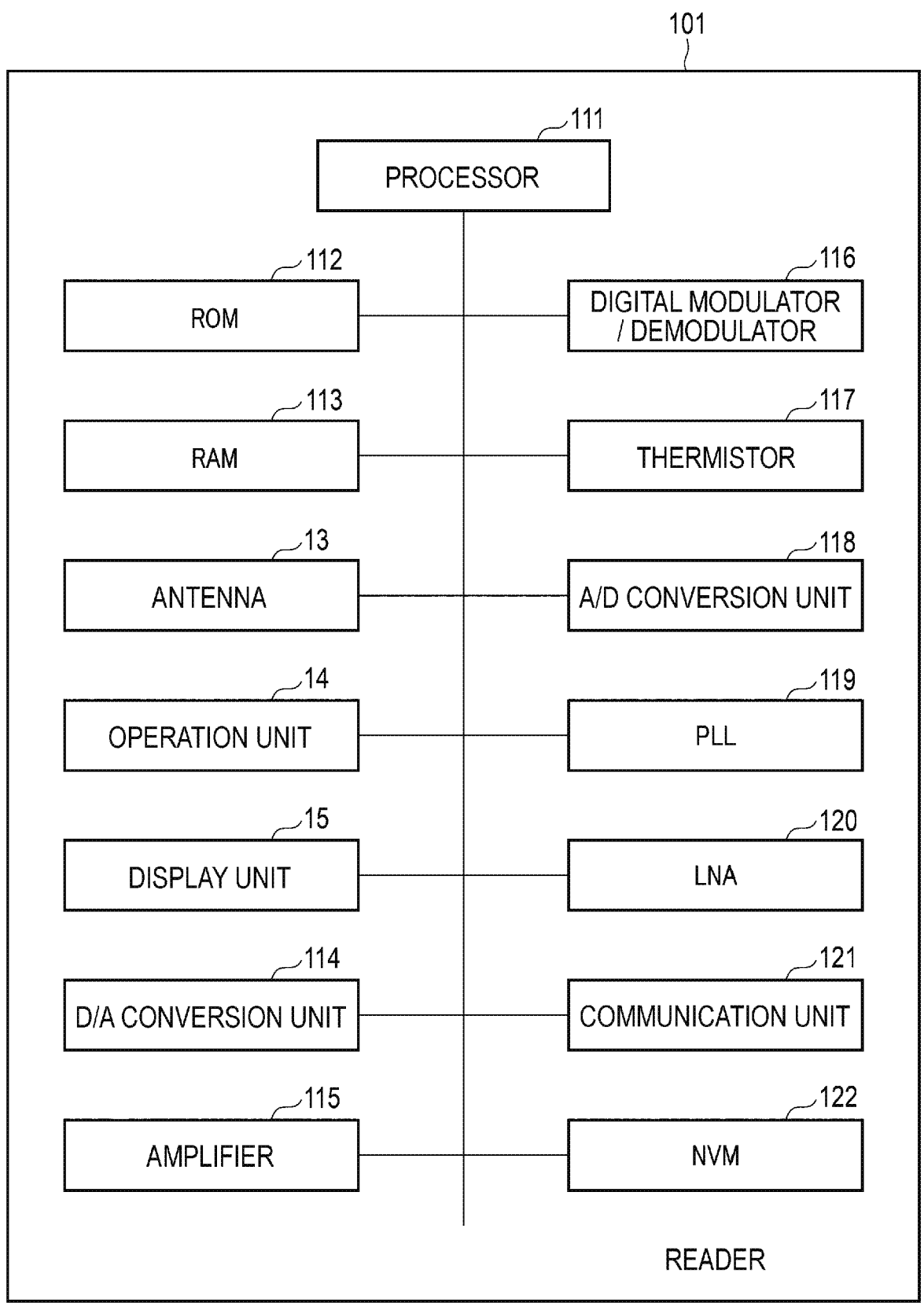
FIG. 4 is a block diagram illustrating a structural example of the reader according to at least one embodiment.

FIG. 4 is a block diagram illustrating a configuration example of a control system of the reader 101. As illustrated in FIG. 4, the reader 101 includes the processor 111, a ROM 112, a RAM 113, the antenna 13, the operation unit 14, the display unit 15, a D/A conversion unit 114, an amplifier 115, a digital modulator and demodulator 116, a thermistor 117, an A/D conversion unit 118, a PLL 119, an LNA 120, a communication unit 121, and an NVM 122.

The processor 111, the ROM 112, the RAM 113, the antenna 13, the operation unit 14, the display unit 15, the D/A conversion unit 114, the amplifier 115, the digital modulator and demodulator 116, the thermistor 117, the A/D conversion unit 118, the PLL 119, the LNA 120, the communication unit 121, and the NVM 122 are connected to each other via a data, for example.

The antenna 13, the operation unit 14, and the display unit 15 have been described above.

The processor 111 (a first processor) controls an operation of the entire reader 101. For example, the processor 111 acquires an ID from a radio tag using the antenna 13. The processor 111 transmits the acquired ID to the POS terminal 201 through the communication unit 121.

For example, the processor 111 is configured by a CPU, for example. The processor 111 may be configured by an application specific integrated circuit (ASIC) or the like. The processor 111 may also be configured by a field programmable gate array (FPGA) or the like.

The ROM 112 is a nonvolatile memory that stores a control program, control data, and the like in advance. The control program and the control data stored in the ROM 112 are embedded in advance in accordance with the specification of the reader 101.

The RAM 113 is a volatile memory. The RAM 113 temporarily stores data or the like which is being processed by the processor 111. The RAM 113 stores various application programs in response to commands from the processor 111. The RAM 113 may store data necessary to execute application programs, results obtained by executing the application programs, and the like.

The D/A conversion unit 114 converts a digital signal into an analog signal. For example, the D/A conversion unit 114 generates an analog signal for causing the antenna 13 to transmit transmission waves under the control of the processor 111.

The amplifier 115 amplifies an analog signal. For example, the amplifier 115 amplifies the analog signal from the antenna 113.

The digital modulator and demodulator 116 performs digital modulation and digital demodulation.

The thermistor 117 is a sensor that measures a temperature.

The A/D conversion unit 118 converts an analog signal into a digital signal. For example, the A/D conversion unit 118 converts the analog signal from the antenna 13 into a digital signal under the control of the processor 111.

The PLL 119 is a phase synchronization circuit.

The LNA 120 is a low noise amplifier.

The communication unit 121 (the first communication unit or first communicator) is an interface for communicating with the POS terminal 201 in a wired or wireless manner. That is, the communication unit 121 is an interface for communicating with the server 30 through the POS terminal 201. For example, the communication unit 121 supports RS-232. The communication unit 121 may support universal serial bus (USB) connection. The communication unit 121 may support wired or wireless local area network (LAN) connection.

The NVM 122 (the storage unit) is a nonvolatile memory capable of writing and rewriting data. The NVM 122 may be, for example, a hard disk drive (HDD), a solid-state drive (SSD), or a flash memory. The NVM 122 stores a control program, an application, various kinds of data, and the like in accordance with an operational use of the reader 101.

The NVM 122 stores channel reports. The channel reports will be described later.

The reader 101 may have a configuration, as necessary, in addition to the configuration illustrated in FIGS. 2 to 4 or a specific configuration may be excluded from the reader 101.

Next, the server 30 will be described.

Figure 5:
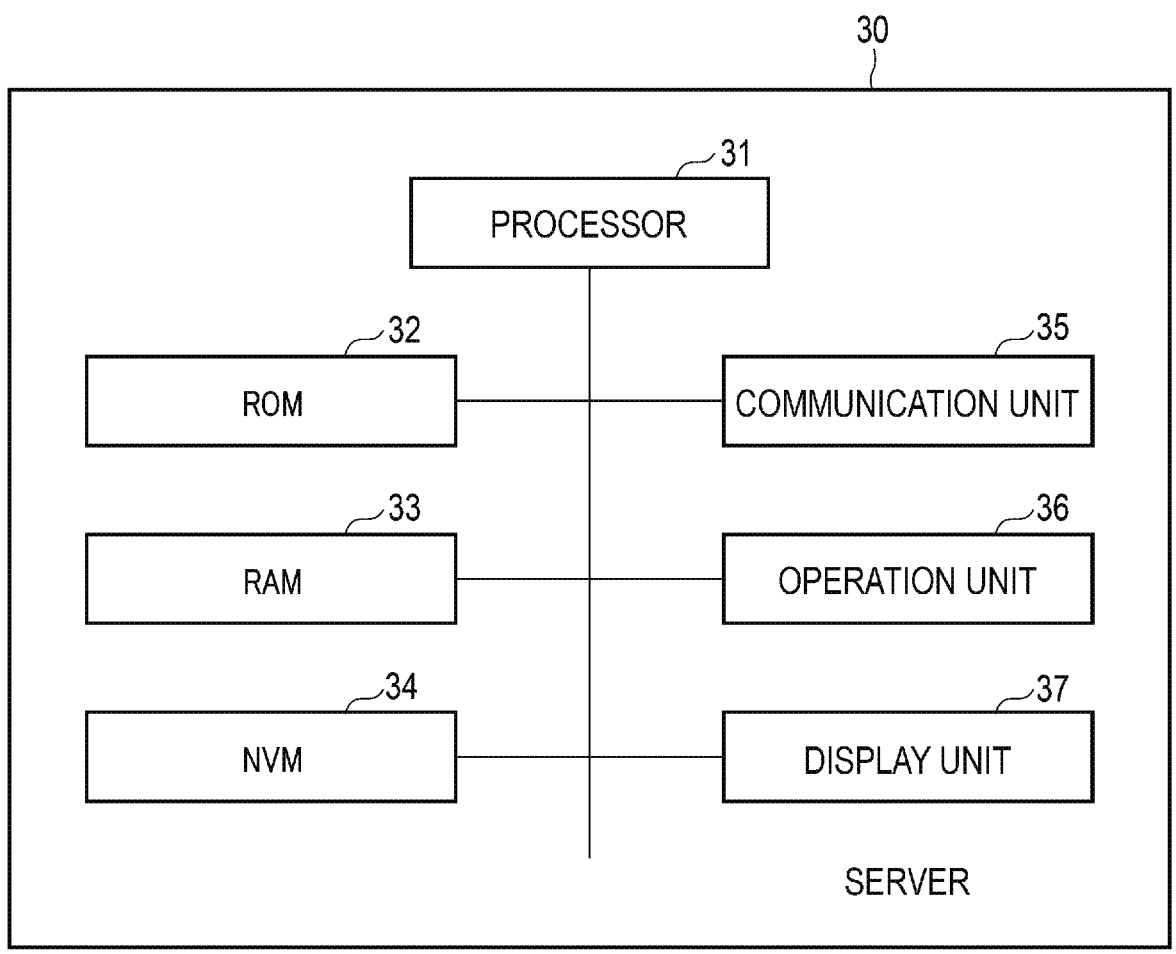
FIG. 5 is a block diagram illustrating a structural example of a POS terminal according to at least one embodiment.

FIG. 5 illustrates a configuration example of the server 30 according to at least one embodiment. FIG. 5 is a block diagram illustrating a configuration example of the server 30. As illustrated in FIG. 5, the server 30 includes a processor 31, a ROM 32, a RAM 33, an NVM 34, a communication unit 35, an operation unit 36, and a display unit 37.

The processor 31, the ROM 32, the RAM 33, the NVM 34, the communication unit 35, the operation unit 36, and the display unit 37 are connected to each other via a data bus or the like.

The server 30 may have a configuration, as necessary, in addition to the configuration illustrated in FIG. 5 or a specific configuration may be excluded from the server 30.

The processor 31 (the second processor) has a function of controlling an operation of the entire server 30. The processor 31 may include an internal cache and various interfaces. The processor 31 realizes various processes by executing programs stored in advance in the internal memory, the ROM 32, or the NVM 34.

Some of various functions realized by causing the processor 31 to execute programs may be realized by a hardware circuit, for example. In this case, the processor 31 controls the functions performed by the hardware circuit.

The ROM 32 is a nonvolatile memory that stores a control program, control data, and the like in advance. The control program and the control data stored in the ROM 32 is embedded in advance in accordance with the specification of the server 30.

The RAM 33 is a volatile memory. The RAM 33 temporarily stores data or the like which is being processed by the processor 31. The RAM 33 stores various application programs in response to commands from the processor 31. The RAM 33 may store data necessary to execute application programs, results obtained by executing the application programs, and the like.

The NVM 34 is a nonvolatile memory capable of writing and rewriting data. The NVM 34 may be, for example, an HDD, an SSD, or a flash memory. The NVM 34 stores a control program, an application, various kinds of data, and the like in accordance with an operational use of the server 30.

The communication unit 35 (the second communication unit or second communicator) is an interface for communicating with the POS terminals 201 to 203. That is, the communication unit 35 is an interface for communicating with the readers 101 to 103 through the POS terminals 201 to 203. For example, the communication unit 35 supports wired or wireless LAN connection.

The operation unit 36 receives an input of various operations from an operator. The operation unit 36 transmits a signal indicating an input operation to the processor 31. The operation unit 36 may be configured by a touch panel.

The display unit 37 displays image data from the processor 31. For example, the display unit 37 is configured by a liquid crystal monitor. When the operation unit 36 is configured by a touch panel, the display unit 37 may be integrated with the operation unit 36.

Next, a channel report will be described.

FIG. 6 illustrates a configuration example of a channel report. As illustrated in FIG. 6, in the channel report, a "channel number", a "channel-usable flag," a "TIME1," a "TIME2," and a "CS level" are stored in association. In the channel report, an "operational time" is stored.

The "channel number" indicates a number of a channel with which the reader 101 can perform communication. That is, the "channel number" is a number indicating a radio wave band with which the processor 111 can transmit and receive data through the antenna 13. Each "channel number" corresponds to a predetermined frequency (for example, about 900 MHz). Here, the "channel numbers" are stored as values of "0" to "18".

The "channel-usable flag" is a flag indicating whether to permit use of a corresponding channel (a channel indicated by a corresponding "channel number") to communicate with a radio tag. Here, "0" indicates that use of a corresponding channel is not permitted to communicate with a radio tag. "1" indicates that use of a corresponding channel is permitted to communicate with a radio tag. The "channel-usable flag" may be set in advance by an operator or the like. Here, "1" is set in the "channel-usable flags" corresponding to the "channel numbers" from "6" to "12".

The "TIME1" indicates a time (a length of a time) in which the reader 101 communicates with a radio tag with a corresponding channel. That is, the "TIME1" indicates a time in which the reader 101 establishes communication with a radio tag with a corresponding channel. Here, the "TIME1" indicates a time in which 10 ms is set as a unit. A value of the "TIME1" corresponding to a channel number (CH) is referred to as a "TIME1 (CH)".

The "TIME2" is a time in which radio waves are received from another terminal with a corresponding channel. For example, the "TIME2" is a time in which another reader (here, the reader 102 or 103) or the like communicates with a radio tag with a corresponding channel. The "TIME2" includes a time in which radio waves from a device other than the POS system 100 are received. Here, the "TIME2" indicates a time in which 10 ms may be set as a unit. A value of the "TIME2" corresponding to a channel number (CH) is referred to as a "TIME2 (CH)".

The "CS level" indicates an intensity value of the radio waves received from another terminal with a corresponding channel. Here, the "CS level" indicates an intensity in which dBm is set as a unit. A value of "CS level" corresponding to a channel number (CH) is referred to as the "CS level (CH)".

The "operational time" is a time which has passed after the reader 101 operates. That is, the "operational time" is a time which has passed after the reader 101 is powered on. Here, the "operational time" is a time in which 10 ms is set as a unit. For example, the processor 111 adds 1 to the "operational time" every other 10 ms.

Next, functions realized by the reader 101 will be described. The functions realized by the reader 101 are realized by causing the processor 111 to execute programs stored in an internal memory, the ROM 112, or the NVM 122, for example.

First, the processor 111 has a function of setting a channel for communicating with a radio tag. That is, the processor 111 has a function of performing carrier sensing.

The processor 111 determines whether to start communication with a radio tag in accordance with an operation input on the operation unit 14, for example, or a signal from the POS terminal 201. When the processor 111 determines to start the communication with the radio tag, the processor 111 selects one channel with a "channel-usable flag" of 1 with reference to the channel report.

When the processor 111 selects one channel, the processor 111 determines whether the selected channel can be used. That is, the processor 111 determines whether radio waves can be received with the selected channel using the antenna 13. When the radio waves are not received with the selected channel, the processor 111 determines that the selected channel can be used. In this case, the processor 111 sets the channels selected as a channel for communicating with the radio tag.

When the radio waves are received with the selected channel, the processor 111 determines that the selected channel cannot be used. In this case, the processor 111 selects another channel with the "channel-usable flag" of 1 with reference to the channel report. When the processor 111 selects the other channel, the processor 111 performs a similar operation to the above-described operation.

When there is no channel which can be set, the processor 111 may display an error indicating that there is no channel which can be set in the display unit 15 or the like. When there is no channel which can be set, the processor 111 may transmit an error indicating that there is no channel which can be set to the POS terminal 201 through the communication unit 121.

When the channel for communicating with the radio tag is set, the processor 111 transmits and receives data to and from the radio tag through the antenna 13 with the set channel. For example, the processor 111 acquires an ID from the radio tag. The processor 111 transmits the acquired ID of the radio tag to the POS terminal 201 through the communication unit 121. The processor 111 may display the acquired ID on the display unit 15.

The processor 111 may transmit predetermined data to the radio tag.

The processor 111 has a function of storing a time in which the communication with the radio tag is performed with the set channel in the channel report.

When the channel is set, the processor 111 starts a timer. When the timer starts, the processor 111 communicates with the radio tag with the set channel (CH). When the communication with the set channel (CH) ends, the processor 111 adds a value to the "TIME1 (CH)" based on a value measured by the timer. For example, the processor 111 adds a value (units of ms) obtained by dividing the value measured by the timer by 10 ms to the "TIME1 (CH)".

The processor 111 has a function of receiving radio waves with each channel while the communication with the radio tag is not performed (a carrier sense time).

The processor 111 sets a predetermined channel (for example, "0") in the carrier sense time. When the channel is set, the processor 111 receives radio waves with the set channel through the antenna 13. That is, the processor 111 acquires an intensity value of the radio waves received with the set channel. Here, the intensity value is a value in which dBm is set as a unit.

When the intensity value is greater than a predetermined reception threshold (for example, "-74" or "-99"), the processor 111 displays a warning indicating that the radio waves are received with the channel on the display unit 15. The processor 111 may output a voice or a warning sound indicating that the radio waves are received with the channel.

When the intensity value of the radio waves received with the set channel is acquired, the processor 111 sets a subsequent channel. When the subsequent channel is set, the processor 111 receives the radio waves with the channel set through the antenna 13 similarly.

The processor 111 repeats the above operation to acquire the intensity value of the radio waves received with each channel.

Here, the processor 111 receives the radio waves with each channel at intervals of 10 ms in the carrier sense time.

The processor 111 has a function of storing the time in which the radio waves are received with each channel and the intensity value of the received radio waves in the channel report in the carrier sense time.

When the processor 111 receives the radio waves with the intensity value greater than the reception threshold with the set channel (CH), the processor 111 measures a time in which the radio waves are received and adds the time to the "TIME2 (CH)". Here, the processor 111 adds 1 to the "TIME2 (CH)" at intervals of 10 ms.

The processor 111 updates the value of the "CS level (CH)" based on the intensity value of the received radio waves in the channel report. When the intensity value is greater than the "CS level (CH)" stored in advance, the processor 111 updates the value of the "CS level (CH)" to the intensity value.

When the intensity value is equal to or less than the "CS level (CH)" stored in advance, the processor 111 keeps the "CS level (CH)".

The processor 111 performs a similar operation at each channel.

The processor 111 has a function of transmitting the channel report to the server 30.

When a request for the channel report is received from the server 30 through the communication unit 121, the processor 111 transmits a response including the channel report to the server 30.

The processor 111 may transmit the channel report to the server 30 at a predetermined interval.

Next, an operation example of the reader 101 will be described.

Figure 7:
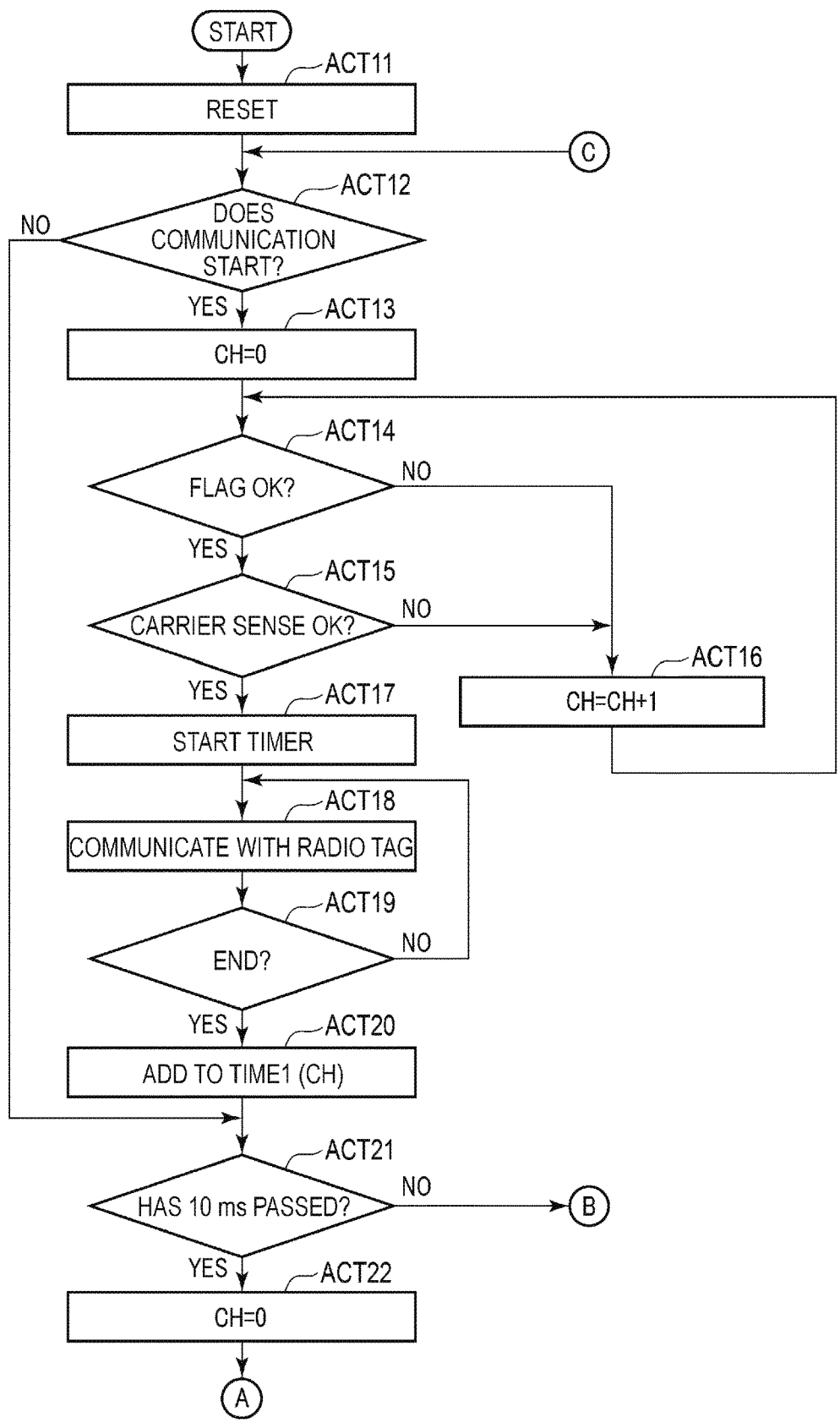
FIG. 7 is a flowchart illustrating an operation example of the reader according to at least one embodiment.
Figure 8:
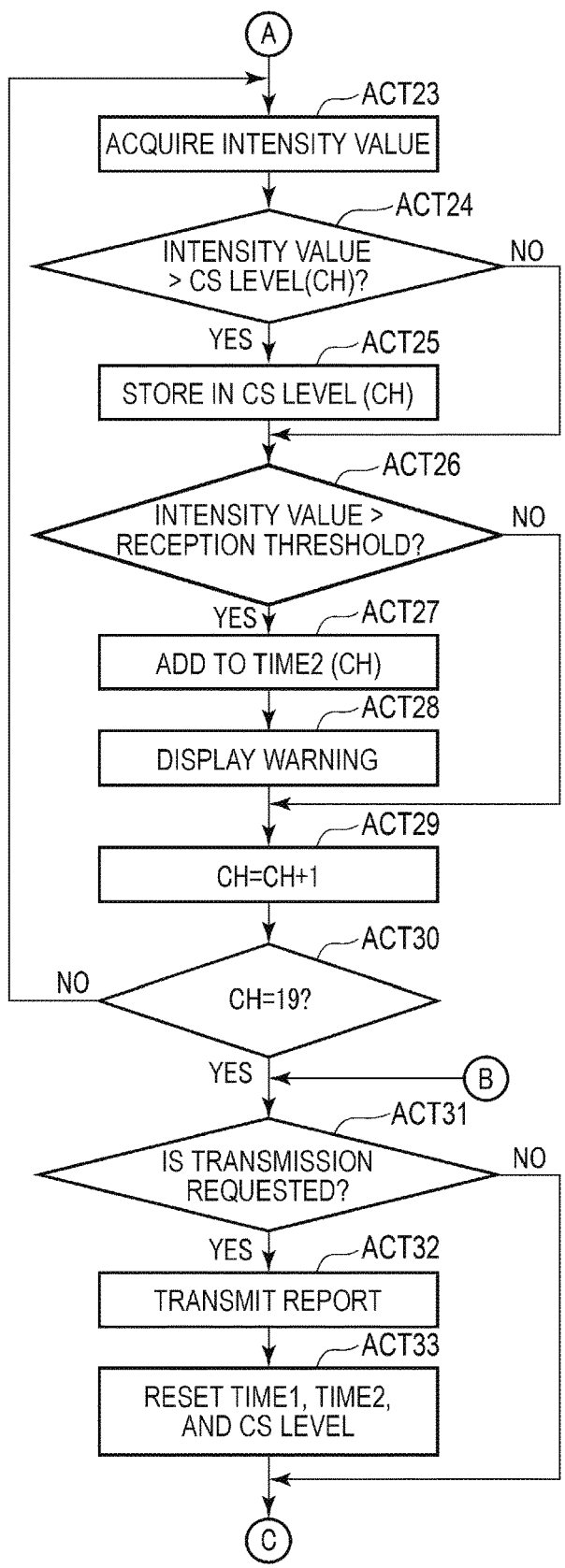
FIG. 8 is a flowchart illustrating an operation example of the reader according to at least one embodiment.

FIGS. 7 and 8 are flowcharts illustrating an operation example of the reader 101.

First, the processor 111 of the reader 101 resets the channel report (ACT11). For example, the processor 111 stores "0" in the "TIME1", the "TIME2," and the "operational time." The processor 111 stores "-99" in the "CS level".

When the channel report is reset, the processor 111 determines whether to start communication with the radio tag (ACT12). When the processor 111 determines to start the communication with the radio tag (YES in ACT12), the processor 111 substitutes 0 into CH indicating the channel number (ACT13).

When the processor 111 substitutes 0 into CH, the processor 111 determines whether the "channel-usable flag" corresponding to CH is "1" (ACT14). When the processor 111 determines that the "channel-usable flag" corresponding to CH is "1" (YES in ACT14), the processor 111 determines whether the channel indicated by CH can be used (ACT15).

When it is determined that the "channel-usable flag" corresponding to CH is not "1" (NO in ACT14) or it is determined that the channel indicated by CH cannot be used (NO in step ACT15), the processor 111 increases CH (ACT16). Here, the processor 111 may return to ACT13 when CH becomes 19. The processor 111 may output an error indicating there is no channel which can be set when CH becomes 19.

When the processor 111 determines that the channel indicated by CH can be used (YES in ACT15), the processor 111 starts a timer (ACT17). When the timer starts, the processor 111 communicates with the radio tag with the channel indicated by CH through the antenna 13 (ACT18).

When the processor 111 communicates with the radio tag, the processor 111 determines whether the communication with the radio tag ends (ACT19). When the processor 111 determines that the communication with the radio tag does not end (NO in ACT19), the processor 111 returns to ACT18.

When the processor 111 determines that the communication with the radio tag does not end (YES in ACT19), the processor 111 adds a value to the "TIME1 (CH)" based on the value measured by the timer (ACT20). When the processor 111 adds the value to the "TIME1 (CH)" (ACT20) or determines that the communication with the radio tag does not start (NO in ACT12), the processor 111 determines whether 10 ms has passed from YES of ACT20 or ACT30 (ACT21).

When the processor 111 determines that 10 ms has passed (YES in ACT21), the processor 111 substitutes 0 into CH (ACT22). When the processor 111 substitutes 0 into CH, the processor 111 acquires the intensity value of the radio waves received through the antenna 13 with the channel indicated by CH (ACT23).

When the processor 111 acquires the intensity value, the processor 111 determines whether the intensity value is greater than the CS level (CH) (ACT24). When the processor 111 determines that the intensity value is greater than the CS level (CH) (YES in ACT24), the processor 111 stores the intensity value in the CS level (CH) (ACT25).

When the processor 111 determines that the intensity value is equal to or less than the CS level (CH) (NO in ACT24) or stores the intensity value in the CS level (CH) (ACT25), the processor 111 determines whether the intensity value is greater than the predetermined reception threshold (ACT26). When the processor 111 determines that the intensity value is greater than the predetermined reception threshold (YES in ACT26), the processor 111 adds 1 to the value of the "TIME2 (CH)" (ACT27). When the processor 111 adds 1 to the value of the "TIME2 (CH)", the processor 111 displays a warning in the display unit 15 (ACT28).

When the processor 111 determines that the intensity value is equal to or less than the predetermined reception threshold (NO in ACT26) or displays the warning on the display unit 15 (ACT28), the processor 111 increases CH (ACT29).

When the processor 111 increases CH, the processor 111 determines whether CH is 19 (ACT30). When the processor 111 determines that CH is not 19 (NO in ACT30), the processor 111 returns to ACT23.

When the processor 111 determines that CH is 19 (YES in ACT30) or determines that 10 ms has not passed (NO in ACT21), the processor 111 determines whether a request for the channel report is received from the server 30 through the communication unit 121 (ACT31).

When the processor 111 determines that the request is received from the server 30 (YES in ACT31), the processor 111 transmits the channel report to the server 30 through the communication unit 121 (ACT32).

When the processor 111 transmits the channel report to the server 30, the processor 111 resets the "TIME1", the "TIME2", and the "CS level" in the channel report (ACT33). That is, the processor 111 substitutes "0" into the "TIME1" and the "TIME2" and substitutes "−99" into the "CS level".

When the processor 111 determines that the request is not received from the server 30 (NO in ACT31) or resets the "TIME1", the "TIME2", and the "CS level" (ACT33), the processor 111 returns to ACT12.

Next, functions realized by the server 30 will be described. The functions realized by the server 30 are realized by causing the processor 31 to execute programs stored in an internal memory, the ROM 32, the NVM 34, or the like.

First, the processor 31 has a function of acquiring the channel report from the readers 101 to 103.

The processor 31 transmits requests for the channel reports through the communication unit 35. The processor 31 acquires responses including the channel reports from the readers 101 to 103 through the communication unit 35.

The channel reports from the readers 101 to 103 are referred to as channel reports (0) to (2), respectively.

The processor 31 may acquire the channel reports transmitted at predetermined intervals by the readers 101 to 103.

The processor 31 has a function of generating an aggregate report based on the channel reports.

The aggregate report indicates each channel state. For example, the aggregate report indicates each channel state while the readers 101 to 103 are not communicating with the radio tags.

FIG. 9 illustrates a configuration example of the aggregate report. As illustrated in FIG. 9, in the aggregate report, a "channel number", an "aggregate TIME1", an "aggregate TIME2", and an "aggregate CS level" are stored in association. In the channel report, an "an aggregate operational time" is stored.

The "channel number" has been described above.

The "aggregate TIME1" (the first time) indicates a sum of times in which the readers 101 to 103 communicate with the radio tags with the corresponding channels. The "aggregate TIME1" indicates a sum of values of "TIME1" in each channel of the channel reports (0) to (2).

Here, the "aggregate TIME1" indicates a time in which 10 ms is set as a unit. A value of the "aggregate TIME1" corresponding to the channel number (CH) is referred to as an "aggregate TIME1 (CH)".

The "aggregate TIME2" (the second time) indicates a sum of times in which the readers 101 to 103 receive the radio waves from other terminals with the corresponding channels. The "aggregate TIME2" indicates the largest value among the times in which the readers 101 to 103 receive the radio waves from the other terminals with the corresponding channels. That is, the "aggregate TIME2" indicates the largest value of the "TIME2" in the channels of the channel reports (0) to (2).

Here, the "aggregate TIME2" indicates a time in which 10 ms is set as a unit. A value of the "aggregate TIME2" corresponding to the channel number (CH) is referred to as an "aggregate TIME2 (CH)".

The "aggregate CS level" indicates a largest value of the intensity value of the radio waves received from the other terminals by the readers 101 to 103 with the corresponding channels. That is, the "aggregate CS level" indicates a largest value of the "CS level" in the channels of the channel reports (0) to (2).

Here, the "aggregate CS level" indicates an intensity in which dBm is set as a unit. A value of the "aggregate CS level" corresponding to a channel number (CH) is referred to as an "aggregate CS level (CH)".

The "aggregate operational time" is a time which has passed after the POS system 100 operates. The "aggregate operational time" is a time in which at least one of the readers 101 to 103 operates. That is, the "aggregate operational time" indicates a largest value of the "operation time" in the channel reports (0) to (2). Here, the "aggregate operational time" indicates a time in which 10 ms is set as a unit.

The processor 31 generates an aggregate report through the following operation.

First, the processor 31 acquires one channel report.

When the processor 31 acquires the channel report, the processor 31 adds the "TIME1" of the channel report to the "aggregate TIME1" of the aggregate report. That is, the processor 31 adds the "TIME1 (CH)" to the "aggregate TIME1 (CH)" in each CH (0 to 18).

When the processor 31 adds the "TIME1" of the channel report to the "aggregate TIME1" of the aggregate report, the processor 31 updates the "aggregate TIME2" of the aggregate report based on the "TIME2" of the channel report. That is, the processor 31 compares the "TIME2 (CH)" with the "aggregate TIME2 (CH)" in each CH. When the "TIME2 (CH)" is greater than the "aggregate TIME2 (CH)", the processor 31 stores the "TIME2 (CH)" in the "aggregate TIME2 (CH)". When the "TIME2 (CH)" is equal to or less than the "aggregate TIME2 (CH)", the processor 31 keeps the "aggregate TIME2(CH)".

When the processor 31 updates the "aggregate TIME2" of the aggregate report based on the "TIME2" of the channel report, the processor 31 updates the "aggregate CS level" of the aggregate report based on the "CS level" of the channel report. The processor 31 compares the "aggregate CS level (CH)" with the "CS level (CH)" in each CH. When the "CS level (CH)" is greater than the "aggregate CS level (CH)," the processor 31 stores the "CS level (CH)" in the "aggregate CS level (CH)". When the "CS level (CH)" is equal to or less than the "aggregate CS level (CH)", the processor 31 keeps the "aggregate CS level (CH)".

When the processor 31 updates the "aggregate CS level" of the aggregate report based on the "CS level" of the channel report, the processor 31 updates the "aggregate operational time" of the aggregate report based on the "operational time" of the channel report. That is, the processor 31 compares the "aggregate operational time" with the "operational time". When the "operational time" is greater than the "aggregate operational time," the processor 31 stores the "operational time" in the "aggregate operational time". When the "operational time" is equal to or less than the "aggregate operational time", the processor 31 keeps the "aggregate operational time".

The processor 31 repeats the above operation in the channel reports (here, the channel reports (0) to (2)) to generate the aggregate report.

The processor 31 may generate the aggregate report at a predetermined interval. When an input of a predetermined operation is received through the operation unit 36, the processor 31 may generate the aggregate report.

The processor 31 has a function of outputting a warning based on the aggregate report.

The processor 31 determines whether the radio waves are received from another device (a device other than the readers 101 to 103) based on the aggregate report.

For example, the processor 31 determines whether the "aggregate TIME2 (CH)" is greater than the "aggregate TIME1 (CH)" at each CH with reference to the generated aggregate report. When the "aggregate TIME2 (CH)" is greater than the "aggregate TIME1 (CH)" at any CH, the processor 31 determines whether the "aggregate CH level (CH)" is greater than a predetermined threshold (for example, "−74" or "−99") at the CH.

When the "aggregate CH level (CH)" is greater than the predetermined threshold, the processor 31 determines that the radio waves are received from another device.

In this case, the processor 31 outputs a warning indicating that the radio waves output by the other device reach the readers 101 to 103. For example, the processor 31 displays the warning on the display unit 37. The processor 31 may output a voice or a warning sound as the warning. The processor 31 may transmit the warning to another device.

The warning may be a warning indicating the CH.

The processor 31 may output the warning to the plurality of CHs.

Next, an operation example of the server 30 will be described.

Figure 10:
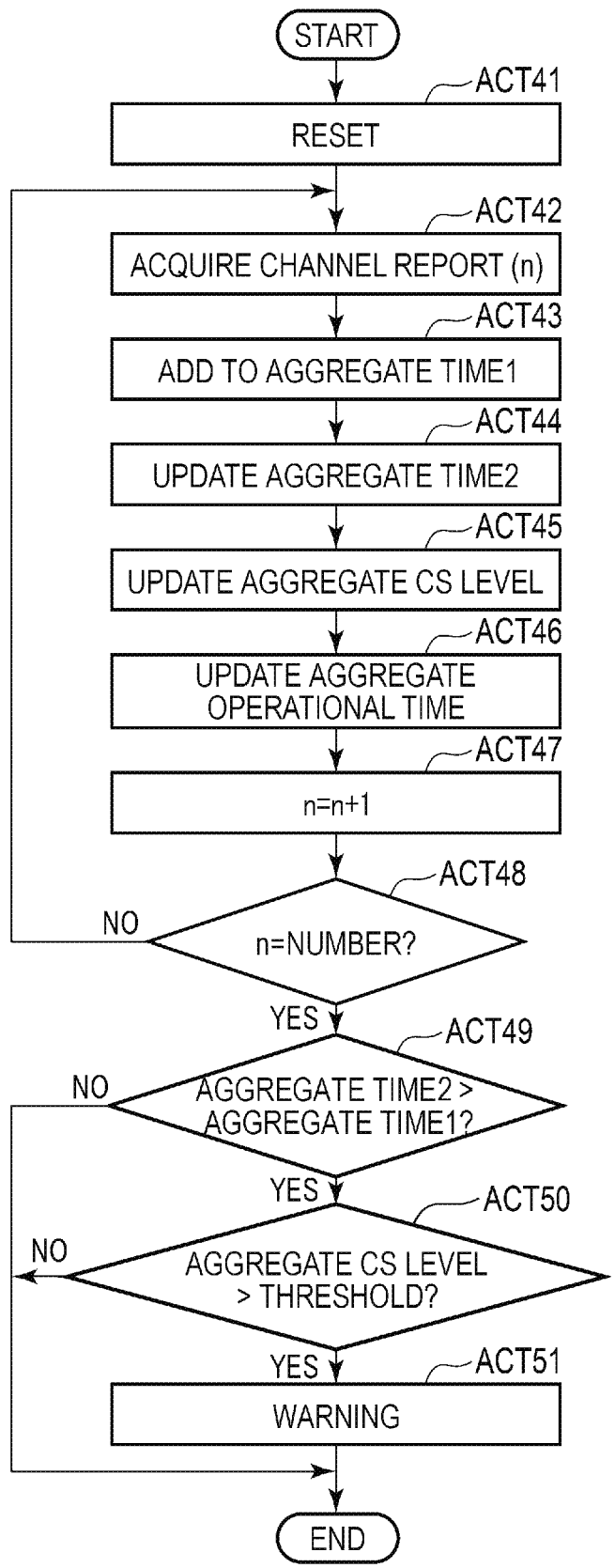
FIG. 10 is a flowchart illustrating an operation example of a server according to at least one embodiment.

FIG. 10 is a flowchart illustrating an operation example of the server 30.

Here, the processor 31 of the server 30 is assumed to start generating the aggregate report.

The processor 31 resets the value of the aggregate report or the like (ACT41). The processor 31 substitutes "0" into the "aggregate TIME1," the "aggregate TIME2", and the "aggregate operational time" of the aggregate report. The processor 31 substitutes "−99" into the "aggregate CS level". The processor 31 substitutes "0" into n indicating a channel report number.

When the processor 31 resets the value of the aggregate report or the like, the processor 31 acquires the channel report (n) (ACT42). When the processor 31 acquires the channel report (n), the processor 31 adds "TIME1" of the channel report (n) to the "aggregate TIME1" (ACT43).

When the processor 31 adds the "TIME1" of the channel report (n) to the "aggregate TIME1", the processor 31 updates the "aggregate TIME2" based on the "TIME2" of the channel report (n) (ACT44).

When the processor 31 updates the "aggregate TIME2" based on the "TIME2" of the channel report (n), the processor 31 updates the "aggregate CS level" based on the "CS level" of the channel report (n) (ACT45).

When the processor 31 updates the "aggregate CS level" based on the "CS level" of the channel report (n), the processor 31 updates the "aggregate operational time" based on the "operational time" of the channel report (n) (ACT46).

When the processor 31 updates the "aggregate operational time" based on the "operational time" of the channel report (n), the processor 31 increases n (ACT47). When the processor 31 increases n, the processor 31 determines whether n is the number of readers (herein, 3) (ACT48).

When the processor 31 determines that n is not the number of readers (NO in ACT48), the processor 31 returns to ACT42.

When the processor 31 determines that n is the number of readers (YES in ACT48), the processor 31 determines whether the "aggregate TIME2 (CH)" is greater than the "aggregate TIME1 (CH)" at each CH (ACT49).

When the processor 31 determines that the "aggregate TIME2 (CH)" is greater than the "aggregate TIME1 (CH)" at any CH (YES in ACT49), the processor 31 determines whether the "aggregate CS level (CH)" is greater than the predetermined threshold at the CH (ACT50).

At the CH, the processor 31 determines whether the "aggregate CS level (CH)" is greater than the predetermined threshold (ACT50). When the processor 31 determines that the "aggregate CS level (CH)" is greater than the predetermined threshold at the CH (YES in ACT50), the processor 31 outputs the warning (ACT51).

When the processor 31 determines that the "aggregate TIME2 (CH)" is equal to or less than the "aggregate TIME1 (CH)" at any CH (NO in ACT49), determines that the "aggregate CS level (CH)" is equal to or less than the predetermined threshold (NO in ACT50), or outputs the warning (ACT51), the processor 31 ends the operation.

The processor 31 may store the acquired channel report in the NVM 34 or the like. When the processor 31 generates the aggregate report, the processor 31 may acquire the channel report from the NVM 34 or the like.

When the "aggregate TIME2 (CH)" is greater than the "aggregate TIME1 (CH)" at any CH, the processor 31 may output the warning.

When the "aggregate TIME2 (CH)" is greater than the "aggregate TIME1 (CH)" at any CH and a difference between the "aggregate TIME2 (CH)" and the "aggregate TIME1 (CH)" is greater than a predetermined threshold, the processor 31 may output the warning.

The radio tag may not be attached to a commodity. The radio tag may be attached to a commodity such as a component, a burden, or an exhibit.

The readers 101 to 103 may be stationary devices. For example, the readers 101 to 103 may include a case into which a commodity is input. In this case, the readers 101 to 103 read IDs from the radio tags attached to commodities input into the cases using the antenna 13.

The server that has the above configuration acquires the channel reports indicating the radio waves received with the channels in the carrier sense time from the readers. The server generates the aggregate report indicating the states of the radio waves from other devices based on the channel reports from the readers. As a result, the server can ascertain the channel state while each reader is not communicating with the radio tag.

While certain embodiments have been described these embodiments have been presented by way of example only, and are not intended to limit the scope of the disclosure. Indeed, the novel embodiments described herein may be embodied in a variety of other forms: furthermore various omissions, substitutions and changes in the form of the embodiments described herein may be made without departing from the spirit of the disclosure. The accompanying claims and the equivalents are intended to cover such forms or modifications as would fall within the scope and spirit of the disclosure.

What is claimed is:

1. A system comprising:
a plurality of readers; and
an information processor,
wherein each reader includes:
a first communicator configured to communicate with the information processor,
an antenna configured to communicate with radio tags, and
a first processor configured to measure a time in which radio waves are received with a plurality of channels in a carrier sense time, the carrier sense time being a time in which the radio tags are not communicating, and to transmit a channel report indicating a time in which radio waves are received with each channel to the information processor through the first communicator, and
wherein the information processor includes:
a second communicator configured to communicate with the plurality of readers, and
a second processor configured to acquire the channel report from each of the plurality of readers through the second communicator and to generate an aggregate report indicating channel states while the plurality of readers are not communicating with the radio tags based on the plurality of acquired channel reports.

2. The system according to claim 1,
wherein the channel report includes a time in which the reader communicates with the radio tag with each channel, and
wherein the aggregate report includes a first time in which the reader communicates with the radio tag with each channel, and a second time in which the reader receives a radio wave with each channel in the carrier sense time.

3. The system according to claim 2,
wherein the second processor is configured to output a warning when the second time is greater than the first time.

4. The system according to claim 3,
wherein the channel report includes an intensity value of the radio wave received in the carrier sense time,
wherein the aggregate report includes the intensity value, and
wherein the second processor is configured to output the warning when the second time is greater than the first time and the intensity value is greater than a predetermined threshold.

5. The system according to claim 1, wherein the reader includes a display configured to display a message.

6. The system according to claim 5, wherein the first processor is configured to, when no channel can be set as a channel for communication, cause the display to display an error message.

7. The system according to claim 1, wherein the first processor is configured to, when a channel for communication is set, set a time determining a time of communication.

8. The system according to claim 1, wherein the reader includes an operational region configured to receive input from a user.

9. The system according to claim 1, wherein the second processor is configured to determine whether or not radio waves are being received by another device based on the aggregate report.

10. An information processor comprising:
a communicator configured to communicate with a plurality of readers; and
a processor configured to:
acquire a channel report indicating a time in which the reader receives a radio wave with each channel from each of the plurality of readers through the communicator, and
generate an aggregate report indicating channel states while the plurality of readers are not communicating with the radio tags based on the plurality of acquired channel reports.

11. The information processor according to claim 10,
wherein the channel report includes a time in which the reader communicates with the radio tag with each channel, and
wherein the aggregate report includes a first time in which the reader communicates with the radio tag with each channel and a second time in which the reader receives a radio wave with each channel in the carrier sense time.

12. The information processor according to claim 11,
wherein the processor is configured to output a warning when the second time is greater than the first time.

13. The information processor according to claim 12,
wherein the channel report includes an intensity value of the radio wave received in the carrier sense time,
wherein the aggregate report includes the intensity value, and
wherein the processor is configured to output the warning when the second time is greater than the first time and the intensity value is greater than a predetermined threshold.

14. A method comprising:
acquiring a channel report indicating a time in which a reader receives a radio wave with each channel from each of the plurality of readers; and
generating an aggregate report indicating channel states while the plurality of readers are not communicating with radio tags based on the plurality of acquired channel reports.

15. The method according to claim 14,
wherein the channel report includes a time in which the reader communicates with the radio tag with each channel, and
wherein the aggregate report includes a first time in which the reader communicates with the radio tag with each channel and a second time in which the reader receives a radio wave with each channel in the carrier sense time.

16. The method according to claim 15, further comprising outputting a warning when the second time is greater than the first time.

17. The method according to claim 16,
wherein the channel report includes an intensity value of the radio wave received in the carrier sense time,
wherein the aggregate report includes the intensity value, and further comprising outputting the warning when the second time is greater than the first time and the intensity value is greater than a predetermined threshold.

* * * * *